July 28, 1959  M. G. ZAVERTNIK  2,896,972
FIXTURE HANGERS

Filed May 8, 1957  2 Sheets-Sheet 1

INVENTOR.
MARSHALL G. ZAVERTNIK
BY
ATTORNEY

July 28, 1959   M. G. ZAVERTNIK   2,896,972
FIXTURE HANGERS
Filed May 8, 1957   2 Sheets-Sheet 2

INVENTOR.
MARSHALL G. ZAVERTNIK
BY
ATTORNEY

United States Patent Office 2,896,972
Patented July 28, 1959

2,896,972

FIXTURE HANGERS

Marshall G. Zavertnik, St. Louis, Mo., assignor to Killark Electric Mfg. Co., St. Louis, Mo., a corporation of Missouri Application May 8, 1957, Serial No. 657,875

1 Claim. (Cl. 285—50)

This invention relates in general to new and useful improvements in electrical conduit fittings and, more particularly, to a fixture hanger.

In hanging or suspending electrical lighting fixtures from the ceiling of a room, it is a common practice to provide a conduit which, at its lower end, supports the fixture, and at its upper end is connected through a coupling or fixture hanger to a splice box, in which case the conduit serves not only to support the fixture but also to carry the electrical wires from the fixture to the source of current. The fixture is usually rigidly connected to the conduit, and the conduit coupled to the hanger by means of flexible copper tubing or a leather gasket. Frequently, however, the amount of flexibility is insufficient to permit an adequate arc of swinging of the fixture or to yield under impact should the fixture accidentally be struck, and, furthermore, such construction usually does not provide a moisture-proof connection between the conduit and splice box with the result that eventually the hanger becomes corroded.

It is, therefore, one of the objects of the present invention to provide an electrical fixture hanger which permits a moisture-proof connection between the hanger and splice box.

It is also an object of the present invention to provide an electrical fixture hanger which provides a resilient connection between the fixture and splice box and is, therefore, highly flexible and impact resistant.

It is a further object of the present invention to provide a fixture hanger of the type stated which is easy to install and prevents accidental dropping of the fixture.

With the above and other objects in view, my invention resides in the novel features of form, construction, arrangement, and combination of parts presently described and pointed out in the claims.

In the accompanying drawings (two sheets)

Figure 1:
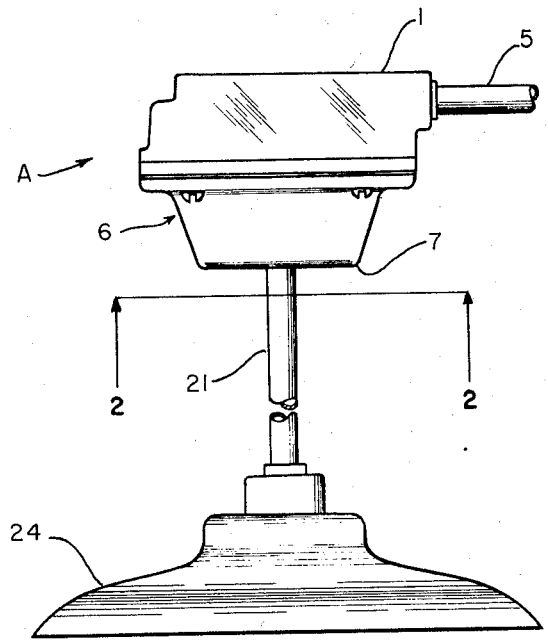
Fig. 1 is a side elevational view of a fixture assembly incorporating a splice hanger constructed in accordance with and embodying the present invention.
Figure 2:
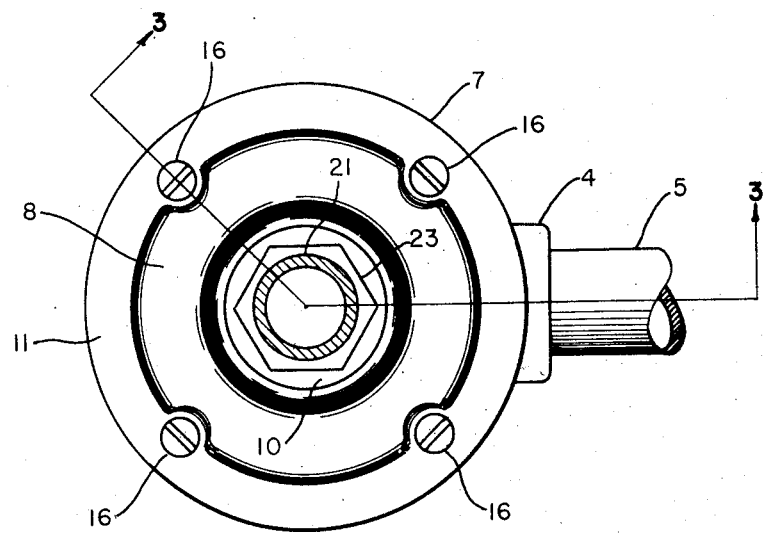
Fig. 2 is a fragmentary sectional view taken along line 2—2 of Fig. 1.

Referring now in more detail and by reference characters to the drawings, which illustrate a preferred embodiment of the present invention, A designates a fixture hanger and splice box assembly including a shell-like splice box 1 provided on its outer cylindrical wall 2 with a plurality of tapped bosses 3, and a radially outwardly extending enlarged boss 4 which is tapped for fluid-tight reception of a correspondingly threaded lead-in conduit 5. Provided for cooperation with the splice box 1 is a fixture hanger 6 comprising a cover shell 7 having a conical wall 8 which terminates at its lower end in a base wall 9 provided with a large circular aperture 10 therein. At its upper end the conical wall 8 terminates in a peripheral flange 11 suitably drilled or otherwise provided with a series of spaced holes 12.

Figure 3:
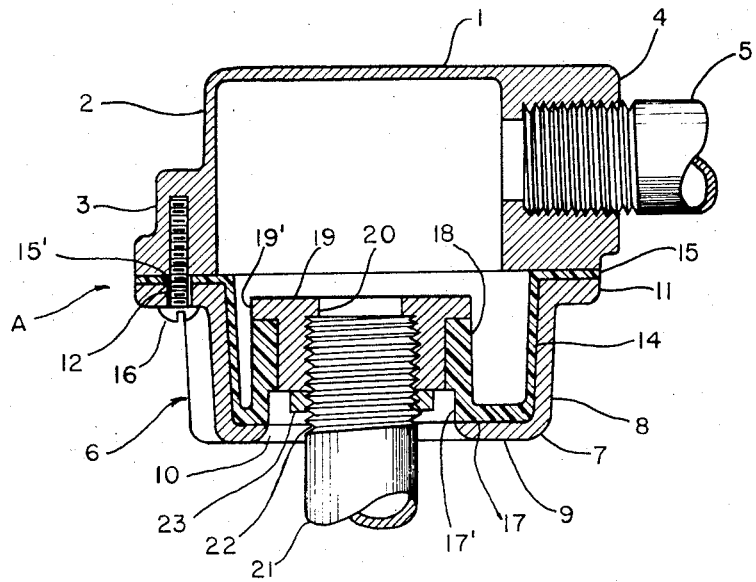
Fig. 3 is a fragmentary sectional view taken along line 3—3 of Fig. 2.
Figure 4:
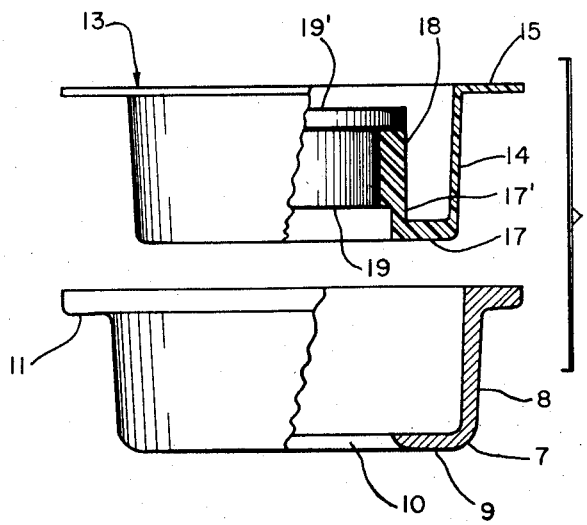
Fig. 4 is a fragmentary exploded view, partially broken away and in section, of the assembly shown in Fig. 3.

Disposed between the cover shell 7 and the splice box 1 is a resilient, flexible cushioning gasket 13 formed of polychloroprene rubber or other suitable rubber having a high resistance to heat, moisture, and oil, and provided with a thin conical wall 14 and a peripheral flange 15 which match the contour of the wall 8 and flange 11 of the cover shell 7, respectively, the flange 15 being provided with spaced holes 15'. As seen by reference to Fig. 3, the holes 12, 15', are aligned with the bosses 3 for reception of screws 16, whereby the cover shell 7 and cushioning gasket 13 can be secured to the splice box 1. At its lower end the wall 14 terminates in a radially inwardly extending, somewhat thickened, bottom wall 17 terminating in a tubular sleeve 17', the outer cylindrical surface of which is spaced from the wall 14. At its upper side the sleeve 17' is formed with a further enlarged portion 18, and bonded within the enlarged portion 18 is a union ring 19 having a peripheral flange 19', the outer diameter of which is equal to that of the sleeve 17' and is slightly greater than the diameter of the aperture 10. The union ring 19 is also formed with a central bore 20 tapped for fluid-tight reception of a conduit 21 having a threaded end 22, the latter being provided with a lock nut 23. The lower end of the conduit 21 supports a conventional lighting fixture 24, and the splice box 1 may be secured to, or suspended from, the ceiling of the room wherein the fixture 24 is used. In this connection it should be noted that the manner of securing the splice box is conventional and is, therefore, not shown or described in detail.

In use, the cover shell 7 is placed over the conduit 21 and the lock nut 23 threaded onto the end portion 22 of the conduit 21. The union ring 19 with its cushioning gasket 13 is then threaded onto the end 22 of the conduit 21, whereupon the lock nut 23 may be additionally tightened. The cover shell 7 is then moved upwardly so as to facewise engage the cushioning gasket 13 and the holes 12, 15', aligned with the bosses 3, whereupon the bolts 16 are threaded into the bosses 3 so as to secure the hanger 6 in place.

It will be apparent that the cushioning gasket 13 provides a moisture-proof seal which prevents corrosion on the inside of the hanger 7 or splice box 1. Furthermore, by reason of the bond between the union ring 19 and the cushioning gasket 13, the conduit 12 and fixture 24 are, in effect, suspended on a rubber cushion which absorbs impact should the fixture 24 be struck and permits the fixture 24 to swing throughout a substantial arc. However, the bond prevents any appreciable amount of twisting of the conduit 21 with respect to the hanger 6. If the cushioning gasket 13 should accidentally become broken, the fixture 24 will not drop to the floor since the sleeve 17' and flange 19' are each of a diameter greater than that of the aperture 10.

It should be understood that changes and modifications in the form, construction, arrangement, and combination of the several parts of the fixture hangers may be made and substituted for those herein shown and described without departing from the nature and principle of my invention.

Having thus described my invention, what I claim and desire to secure by Letters Patent is:

A hanger for a depending electric light fixture adapted to be secured to a splice box, said fixture hanger comprising a cover shell, said cover shell having a circumferential flat wall and a bottom flat wall with a central opening therein and an upper peripheral flange, a union ring suspended within said cover shell above said bottom wall, said ring having a bore to receive therein and suspend therefrom a depending conduit, a rubbery moisture impervious gasket comprising substantially spaced inner and outer concentric sleeves connected by a bottom wall, said inner sleeve of said gasket covering and being bonded in facewise contact to substantially the outer surface of the side of said ring, said outer sleeve and bottom wall of said gasket covering and being bonded in facewise contact to the inside surface of the circumferential wall and inside surface of said bottom wall, respectively, of said cover shell, said outer sleeve having a peripheral flange at its upper end adapted to be positioned between the flange of said cover shell and said splice box, said inner sleeve having the lower end of its inside surface undercut and projecting below the lower end of said union ring, the diameter of the opening in the bottom wall of said cover shell being substantially greater than the outside diameter of said conduit but smaller than the outer diameter of said inner sleeve.

References Cited in the file of this patent

UNITED STATES PATENTS

| | | |
|---|---|---|
| 917,847 | Carey | Apr. 13, 1909 |
| 1,862,153 | Lee | June 7, 1932 |
| 2,147,691 | Cramton | Feb. 21, 1939 |
| 2,164,471 | Parker | July 4, 1939 |
| 2,467,639 | Tornblom | Apr. 19, 1949 |
| 2,472,061 | Blass et al. | June 7, 1949 |

FOREIGN PATENTS

| | | |
|---|---|---|
| 387,687 | Great Britain | Feb. 7, 1933 |
| 472,773 | Great Britain | Sept. 30, 1939 |
| 525,086 | Great Britain | Aug. 21, 1940 |